(12) United States Patent
Li et al.

(10) Patent No.: US 11,363,294 B2
(45) Date of Patent: Jun. 14, 2022

(54) IMAGE PROCESSING METHOD AND IMAGE PROCESSING DEVICE

(71) Applicant: SZ DJI TECHNOLOGY CO., LTD., Shenzhen (CN)

(72) Inventors: Weiran Li, Shenzhen (CN); Xiaozhen Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/039,841

(22) Filed: Sep. 30, 2020

(65) Prior Publication Data
US 2021/0021855 A1    Jan. 21, 2021

Related U.S. Application Data

(63) Continuation of application No. PCT/CN2018/081652, filed on Apr. 2, 2018.

(51) Int. Cl.
*H04N 19/58* (2014.01)
*H04N 19/139* (2014.01)
(Continued)

(52) U.S. Cl.
CPC .......... *H04N 19/58* (2014.11); *H04N 19/105* (2014.11); *H04N 19/119* (2014.11);
(Continued)

(58) Field of Classification Search
CPC .... H04N 19/58; H04N 19/139; H04N 19/513; H04N 19/56
See application file for complete search history.

(56) References Cited

U.S. PATENT DOCUMENTS

| 8,798,156 B2 | 8/2014 | Jeon |
| 9,497,481 B2 | 11/2016 | Kitahara et al. |

(Continued)

FOREIGN PATENT DOCUMENTS

| CN | 101573985 A | 11/2009 |
| CN | 101873500 A | 10/2010 |

(Continued)

OTHER PUBLICATIONS

The World Intellectual Property Organization (WIPO) International Search Report for PCT/CN2019/078051 dated May 22, 2019 4 Pages (including translation).
(Continued)

*Primary Examiner* — Jeremiah C Hallenbeck-Huber
(74) *Attorney, Agent, or Firm* — Anova Law Group, PLLC

(57) ABSTRACT

A video processing method includes determining an image before a current frame in time sequence as a long-term reference image according to an identifier, determining a motion vector candidate list of a current coding unit, receiving a plurality of indexes, and obtaining an initial motion vector of the current coding unit from the motion vector candidate list according to the indexes. If a reference image pointed to by the initial motion vector is a short-term reference image, the initial motion vector is corrected to obtain a corrected motion vector and prediction is performed for the current coding unit according to the corrected motion vector. If the reference image is a long-term reference image, prediction is performed for the current coding unit according to the initial motion vector without correcting the initial motion vector.

20 Claims, 4 Drawing Sheets

(51) Int. Cl.

| | | |
|---|---|---|
| *H04N 19/513* | (2014.01) | |
| *H04N 19/56* | (2014.01) | |
| *H04N 19/129* | (2014.01) | |
| *H04N 19/176* | (2014.01) | |
| *H04N 19/105* | (2014.01) | |
| *H04N 19/119* | (2014.01) | |
| *H04N 19/30* | (2014.01) | |
| *H04N 19/137* | (2014.01) | |
| *H04N 19/96* | (2014.01) | |
| *H04N 19/573* | (2014.01) | |

(52) U.S. Cl.
CPC ......... *H04N 19/129* (2014.11); *H04N 19/137* (2014.11); *H04N 19/139* (2014.11); *H04N 19/176* (2014.11); *H04N 19/30* (2014.11); *H04N 19/513* (2014.11); *H04N 19/56* (2014.11); *H04N 19/573* (2014.11); *H04N 19/96* (2014.11)

(56) References Cited

U.S. PATENT DOCUMENTS

| | | | |
|---|---|---|---|
| 2005/0013498 | A1 | 1/2005 | Srinivasan et al. |
| 2006/0269153 | A1 | 11/2006 | Shi et al. |
| 2012/0128060 | A1 | 5/2012 | Lin et al. |
| 2012/0128071 | A1 | 5/2012 | Celetto et al. |
| 2012/0269270 | A1 | 10/2012 | Chen et al. |
| 2012/0320981 | A1 | 12/2012 | Shimada et al. |
| 2013/0107963 | A1 | 5/2013 | Wahadaniah et al. |
| 2013/0107964 | A1 | 5/2013 | Wahadaniah et al. |
| 2013/0107965 | A1* | 5/2013 | Wahadaniah ........ H04N 19/176 375/240.16 |
| 2013/0114742 | A1 | 5/2013 | Hannuksela et al. |
| 2014/0016701 | A1 | 1/2014 | Chen et al. |
| 2014/0098876 | A1 | 4/2014 | Jeon |
| 2014/0153641 | A1 | 6/2014 | Kim et al. |
| 2014/0169475 | A1 | 6/2014 | Zhang et al. |
| 2014/0233651 | A1 | 8/2014 | Nakamura et al. |
| 2014/0307783 | A1* | 10/2014 | Kim .................... H04N 19/513 375/240.03 |
| 2014/0314147 | A1 | 10/2014 | Rusanovskyy et al. |
| 2014/0376638 | A1 | 12/2014 | Nakamura et al. |
| 2015/0085929 | A1 | 3/2015 | Chen et al. |
| 2015/0195558 | A1 | 7/2015 | Kim |
| 2016/0330472 | A1 | 11/2016 | Han et al. |
| 2017/0289566 | A1 | 10/2017 | He et al. |
| 2017/0332099 | A1 | 11/2017 | Lee et al. |
| 2017/0347128 | A1 | 11/2017 | Panusopone et al. |
| 2018/0052986 | A1 | 2/2018 | Stolbikov et al. |
| 2018/0199055 | A1 | 7/2018 | Sun et al. |
| 2018/0199057 | A1* | 7/2018 | Chuang ................ H04N 19/533 |
| 2018/0316918 | A1* | 11/2018 | Drugeon .............. H04N 19/176 |
| 2019/0182504 | A1 | 6/2019 | Lainema |
| 2019/0342557 | A1* | 11/2019 | Robert ................. H04N 19/176 |
| 2020/0029092 | A1 | 1/2020 | Rath et al. |
| 2020/0053361 | A1 | 2/2020 | Robert et al. |
| 2020/0120344 | A1 | 6/2020 | Daerr et al. |
| 2020/0296414 | A1 | 9/2020 | Park et al. |
| 2021/0021818 | A1 | 1/2021 | Lee et al. |

FOREIGN PATENT DOCUMENTS

| | | |
|---|---|---|
| CN | 102447904 A | 5/2012 |
| CN | 103190151 A | 7/2013 |
| CN | 103299636 A | 9/2013 |
| CN | 103329537 A | 9/2013 |
| CN | 103636218 A | 3/2014 |
| CN | 103748879 A | 4/2014 |
| CN | 104488272 A | 4/2015 |
| CN | 104796724 A | 7/2015 |
| CN | 106375770 A | 2/2017 |
| CN | 106534858 A | 3/2017 |
| CN | 107071477 A | 8/2017 |
| CN | 107105281 A | 8/2017 |
| CN | 107534778 A | 1/2018 |
| CN | 107682705 A | 2/2018 |
| CN | 107820095 A | 3/2018 |
| EP | 2763416 A1 | 8/2014 |
| EP | 2863631 A1 | 4/2015 |
| EP | 3200461 A1 | 8/2017 |
| WO | 2017157281 A1 | 9/2017 |
| WO | 2018052986 A1 | 3/2018 |

OTHER PUBLICATIONS

The World Intellectual Property Organization (WIPO) International Search Report for PCT/CN2018/081652 dated Jan. 8, 2019 6 Pages (including translation).

The World Intellectual Property Organization (WIPO) International Search Report for PCT/CN2018/095710 dated Dec. 29, 2018 8 Pages (including translation).

The World Intellectual Property Organization (WIPO) International Search Report for PCT/CN2018/103693 dated May 31, 2019 6 Pages (including translation).

The World Intellectual Property Organization (WIPO) International Search Report for PCT/CN2018/107436 dated Nov. 30, 2018 4 Pages (including translation).

The World Intellectual Property Organization (WIPO) International Search Report for PCT/CN2018/112805 dated Jan. 30, 2019 10 Pages (including translation).

Bernd Girod, Motion-Compensating Prediction with Fractional-Pel Accuracy, IEEE Transactions on Communications, Apr. 1993, pp. 604-612, vol. 41, No. 4.

Xiaoyu Xiu, et al., CE4.2 5: Simplifications on advanced temporal motion vector prediction (ATMVP), Joint Video Experts Team (JVET) of ITU-T SG 16 WP 3 and ISO/IEC JTC 1/SC 29/WG 11, Jul. 2018.

Hyeongmun Jang, et al., [CE4-2.6] Simplified ATMVP, Joint Video Experts Team (JVET) of ITU-T SG 16 WP 3 and ISO/IEC JTC 1/SC 29/WG 11, Jul. 2018.

Karsten Suehring, VVC reference software, VTM-2.0, Fraunhofer HHI, 2019. https://vcgit.hhi.fraunhofer.de/jvet/WCSoftware_VTM/-/tree/VTM-2.0.

Takahashi Y et al.: "High-level Syntax: Motion vector prediction issue for long-term reference picture", 10. JCT-VC Meeting; 101. MPEG Meeting; Nov. 7, 2012-Jul. 20, 2012; No. JCTVC-J0071, Jun. 29, 2012.

Chen Fangdong et al: "Block-Composed Background Reference for High Efficiency Video Coding", IEEE Transactions On Circuits and Systems for Video Technology, IEEE, USA, vol. 27, No. 12, Dec. 1, 2017, pp. 2639-2651.

Chen J et al.: "Algorithm description of Joint Exploration Test Model 7 (JEM7)", No. G1001_v1; JVET-G1001, Aug. 19, 2017, pp. 1-48.

Seungsoo Jeong et al.: "CE4 Ultimate motion vector expression in JVET-J0024 (Test 4.2.9)", No. JVET-K0115_v4; JVET-K0115, Jul. 12, 2018, pp. 1-7.

Alshin A et al.: "Description of SDR, HDR and 360° video coding technology proposal by Samsung, Huawei, GoPro, and HiSilicon—mobile application scenario", No. m42354, Apr. 14, 2018.

"Algorithm description of Joint Exploration Test Model 7 (JEM7)", 119. MPEG Meeting, Torino; (Motion Picture Expert Group or ISO/IEC JTC1/SC29/WG11), No. n17055, Oct. 6, 2017.

Xiu X et al: "Description of SDR, HDR and 360" video coding technology proposal by InterDigital Communications and Dolby Laboratories,10. JVET Meeting, No. JVET-J0015, Apr. 3, 2018.

Li (Panasonic) J et al: "AHG5: Reduction of worst case memory bandwidth", 124. MPEG Meeting, No. m44131, Oct. 5, 2018.

* cited by examiner

200

| Obtain a first initial motion vector and second initial motion vector, where the first initial motion vector points to a first reference image and the second initial motion vector points to a second reference image | — 210 |

↓

| When at least one of the first reference image or the second reference image is a long-term reference image, calculate a predicted image block of the current image block based on the first initial motion vector and the second initial motion vector | — 220 |

↓

| When the first reference image and the second reference image are both short-term reference images, calculate the motion vector of the current image block based on the gradients at the pixels pointed to by the first initial motion vector and the second initial motion vector, and calculate a predicted image block of the current image block based on the motion vector of the current image block | — 230 |

FIG. 5

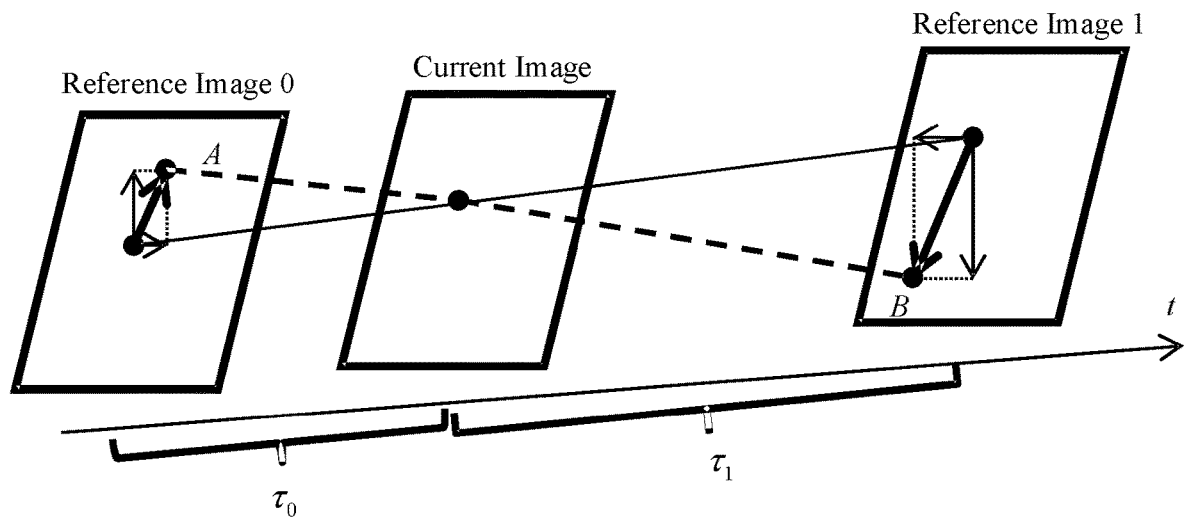

FIG. 6

IMAGE PROCESSING METHOD AND IMAGE PROCESSING DEVICE

CROSS-REFERENCE TO RELATED APPLICATION

This application is a continuation of International Application No. PCT/CN2018/081652, filed Apr. 2, 2018, the entire content of which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of image processing, and in particular to an image processing method and an image processing device.

BACKGROUND

In recent years, due to the prevalence of portable devices, handheld devices and wearable devices, the amount of video content has been increasing. As the form of videos becomes more and more complex, the storage and transmission of video becomes more and more challenging. In order to reduce the bandwidth occupied by video storage and transmission, video data is usually encoded and compressed at the encoding end and decoded at the decoding end.

The encoding and compression process includes prediction, transformation, quantization, entropy encoding, and etc. Prediction includes intra prediction and inter prediction, the purpose of which is to use prediction block data to remove the redundant information of the current image block to be coded. Intra prediction uses the information of the current image to obtain the prediction block data. Inter prediction uses the information of a reference image to obtain the prediction block data. The process includes dividing the current image to be coded into several image blocks to be coded, and then dividing the image block to be coded into several sub-blocks. For each sub-block, a predicted image block is obtained by searching for an image block that best matches the current sub-block in the reference image, and a relative displacement between the predicted image block and the current sub-block is obtained as a motion vector. Thereafter, residuals are obtained by subtracting the corresponding pixel values of the sub-block and the predicted image block. The residuals of the image block to be coded are obtained by combining the corresponding residuals of the obtained sub-blocks together. The residuals are processed through transformation, quantization, and entropy encoding to obtain an entropy-coded bitstream. The entropy-coded bitstream and encoded encoding mode information, such as intra prediction mode, motion vector (or motion vector difference), etc., are stored or sent to the decoding end.

At the image decoding end, the entropy-coded bitstream is obtained and the entropy decoding is performed to obtain the corresponding residuals. The predicted image block corresponding to the image block to be decoded is obtained based on the decoded motion vector, intra prediction, and other information. Then the values of various pixels in the image block to be decoded are obtained according to the predicted image block and residuals.

When inter prediction is performed, the more similar the selected reference image is to the current image to be coded, the smaller the residual generated by inter prediction will be, thereby improving the encoding efficiency of inter prediction. Specifically, with existing technologies, a high-quality specific reference image that contains the background content of the scene can be constructed by using various images of the video. When inter prediction is being performed, the residual information of the inter prediction can be reduced for the background portion of the current image to be encoded or the current image to be decoded by referring to the high-quality specific reference image, thereby improving encoding efficiency. That is, the specific reference image is a reference image that is used for inter prediction. A long-term reference image is not a decoded image, but an artificially composed image. The long-term reference image includes multiple image blocks, and any one image block is taken from a decoded image. Different image blocks in the long-term reference image may be taken from different decoded images.

In this disclosure, reference images other than long-term reference images and non-long-term reference images are referred to as short-term reference images.

In order to improve encoding efficiency and reduce the amount of information sent by the encoding end, some existing technologies directly derive motion vectors at the decoding end. The encoding end does not need to send motion vector information or motion vector difference information, and the decoding end does not need to decode the motion vector information or motion vector difference information to obtain a true motion vector.

In some existing technologies, the particularity of long-term reference images is not considered while implementing motion vector derivation and bidirectional motion prediction. In some technologies that use motion vector derivation, whether the reference image pointed to by the motion vector is a long-term reference image is not considered. Therefore, motion search may be performed on the long-term reference image while performing motion vector correction, which reduces the search efficiency and encoding efficiency. In the technique of bidirectional motion prediction, the motion vector is operated according to the temporal correlation of the image. When the reference image pointed to by the motion vector is a long-term reference image, the definition of temporal distance between the current image to be encoded or the current image to be decoded and the long-term reference image is not clear. As a result, these operations may fail.

SUMMARY

In accordance with the disclosure, there is provided a video processing method including receiving a plurality of indexes indicating an initial motion vector, determining a reference image before a current frame in time sequence as a long-term reference image according to a frame identifier, and obtaining a first initial motion vector and a second initial motion vector of a current coding unit from a motion vector candidate list according to the indexes. The first initial motion vector points to a first reference image that is a forward frame of the current frame, and the second initial motion vector points to a second reference image that is a backward frame of the current frame. The method further includes, in response to the first reference image and the second reference image being short-term reference images, performing a first search near an image block pointed to by the first initial motion vector in the first reference image and obtaining a first corrected motion vector based on an image block found by the first search, performing a second search near an image block pointed to by the second initial motion vector in the second reference image and obtaining a second corrected motion vector based on an image block found by the second search, and performing prediction for the current coding unit according to the first corrected motion vector and the second corrected motion vector. The method also includes, in response to determining the first reference image to be the long-term reference image according to a frame identifier of the first reference image, performing prediction for the current coding unit according to the first initial motion vector and the second initial motion vector without correcting the first initial motion vector and the second initial motion vector, and, in response to determining the second reference image to be the long-term reference image according to a frame identifier of the second reference image, performing prediction for the current coding unit according to the first initial motion vector and the second initial motion vector without correcting the first initial motion vector and the second initial motion vector.

Also in accordance with the disclosure, there is provided a video processing device including a memory storing computer executable instructions and a processor configured to execute the instructions to receive a plurality of indexes indicating an initial motion vector, determine a reference image before a current frame in time sequence as a long-term reference image according to a frame identifier, and obtain a first initial motion vector and a second initial motion vector of a current coding unit from a motion vector candidate list according to the indexes. The first initial motion vector points to a first reference image that is a forward frame of the current frame, and the second initial motion vector points to a second reference image that is a backward frame of the current frame. The processor is further configured to execute the instructions to, in response to the first reference image and the second reference image being short-term reference images, perform a first search near an image block pointed to by the first initial motion vector in the first reference image and obtain a first corrected motion vector based on an image block found by the first search, perform a second search near an image block pointed to by the second initial motion vector in the second reference image and obtain a second corrected motion vector based on an image block found by the second search, and perform prediction for the current coding unit according to the first corrected motion vector and the second corrected motion vector. The processor is also configured to execute the instructions to, in response to determining the first reference image to be the long-term reference image according to a frame identifier of the first reference image, perform prediction for the current coding unit according to the first initial motion vector and the second initial motion vector without correcting the first initial motion vector and the second initial motion vector, and, in response to determining the second reference image to be the long-term reference image according to a frame identifier of the second reference image, perform prediction for the current coding unit according to the first initial motion vector and the second initial motion vector without correcting the first initial motion vector and the second initial motion vector.

BRIEF DESCRIPTION OF THE DRAWINGS

FIG. 5 is a schematic flowchart of an image processing method according to another embodiment of the disclosure.

FIG. 6 is a schematic diagram showing the principle of the BIO technology according to an embodiment of the disclosure.

DETAILED DESCRIPTION OF THE EMBODIMENTS

Figure 1:
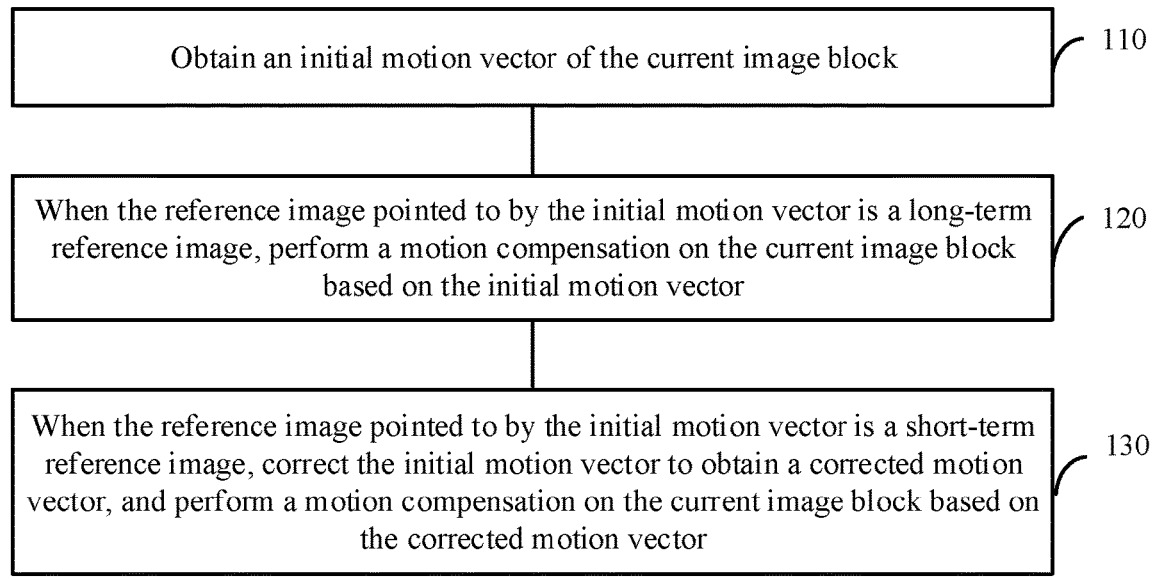
FIG. 1 is a schematic flowchart of an image processing method according to an embodiment of the disclosure.

The technical solutions in the embodiments of the present disclosure are described below with reference to the accompanying drawings.

Unless otherwise defined, all technical and scientific terms used in the disclosure have the same meaning as commonly understood by those of ordinary skill in the art. The terminology used in the specification of the present disclosure is for the purpose of describing specific embodiments only and is not intended to limit the present disclosure.

A video includes multiple images (or pictures). When a video is being encoded/decoded, different prediction methods can be used for different pictures in the video. According to the prediction method adopted by the picture, the picture can be an intra prediction picture or an inter prediction picture. The inter prediction picture can be a forward prediction picture or a bidirectional prediction picture. An I picture is an intra prediction picture, also known as a key frame. A P picture is a forward prediction picture, that is, a P picture or an I picture that has been previously encoded/decoded is used as a reference image. A B picture is a bidirectional prediction picture, that is, the preceding and following pictures are used as reference images. In one implementation, at the encoding/decoding end, multiple pictures are encoded/decoded to generate a group of pictures (GOP). The GOP is composed of one I picture and multiple B pictures (or bidirectional prediction pictures) and/or P pictures (or forward prediction pictures). During playback, the decoding end reads the GOP section by section for decoding and then reads the pictures for rendering and display.

Images of different resolutions can be encoded/decoded by dividing the image into multiple small blocks, that is, the image can be divided into multiple image blocks. An image can be divided into any number of image blocks. For example, the image can be divided into an m×n image block array. The image block may have a rectangular shape, a square shape, a circular shape, or any other shape. The image block may have any size, for example, p×q pixels. Different image blocks may have the same size and/or shape. In some embodiments, two or more image blocks may have different sizes and/or shapes. The image blocks may or may not have any overlapping portions. In some embodiments, the image block is called a macroblock or a largest coding unit (LCU). In the H.264 standard, the image block is called a macroblock, and its size can be 16×16 pixels. In High Efficiency Video Coding (HEVC) standard, the image block is called an LCU, and its size can be 64×64 pixels.

In some other embodiments, an image block may not be a macroblock or an LCU, but a part of a macroblock or an LCU, or includes at least two complete macroblocks (or LCUs), or includes at least one complete macroblock (or LCU) and a part of one macroblock (or LCU), or includes at least two complete macroblocks (or LCUs) and parts of some macroblocks (or LCUs). In this way, after the image is divided into a plurality of image blocks, these image blocks in the image data can be separately encoded/decoded.

The encoding process includes prediction, transformation, quantization, entropy encoding, and etc. Prediction includes intra prediction and inter prediction, the purpose of which is to use prediction block data to remove the redundant information of the current image block to be coded. Intra prediction uses the information of the current image to obtain the prediction block data. Inter prediction uses the information of a reference image to obtain the prediction block data. The process includes dividing the current image to be coded into several image blocks to be coded, and then dividing the image block to be coded into several sub-blocks. For each sub-block, a predicted image block is obtained by searching for an image block that best matches the current sub-block in the reference image, and a relative displacement between the predicted image block and the current sub-block is obtained as a motion vector. Thereafter, residuals are obtained by subtracting the corresponding pixel values of the sub-block and the predicted image block. The residuals of the image block to be coded are obtained by combining the corresponding residuals of the obtained sub-blocks together.

In the embodiments of the present disclosure, a transformation matrix can be used to remove the correlation of the residuals of the image blocks, that is, to remove redundant information of the image blocks, therefore the coding efficiency is improved. The transformation of the data block in the image block usually adopts two-dimensional transformation, that is, at the encoding end, the residual information of the data block is multiplied by an N×M transformation matrix and the transposed matrix of the transformation matrix, to obtain transformation coefficients. The transformation coefficients can be quantized to obtain quantized coefficients. Finally, the quantized coefficients are entropy encoded to obtain an entropy-coded bitstream. The entropy-coded bitstream and encoded encoding mode information, such as intra prediction mode, motion vector (or motion vector difference), etc., are stored or sent to the decoding end. At the image decoding end, the entropy-coded bitstream is obtained and the entropy decoding is performed to obtain the corresponding residuals. The predicted image block corresponding to the image block is obtained based on the decoded motion vector, intra prediction and other information. Then the value of each pixel in the current sub-block is obtained according to the predicted image block and residual.

Using encoded/decoded image as the reference image for the current image to be coded/decoded is described above. In some embodiments, a reference image may be constructed to improve the similarity between the reference image and the current image to be encoded/decoded. For example, there is a specific type of encoding/decoding scene in the video content, in which the background basically does not change and only the foreground in the video changes or moves. For example, video surveillance belongs to this type of scene. In video surveillance scenes, the surveillance camera is usually fixed or only moves slowly, and it can be considered that the background basically does not change. In contrast, objects such as people or cars photographed by the video surveillance camera often move or change, and it can be considered that the foreground changes frequently. In such scenes, a specific reference image can be constructed, and the specific reference image contains only high-quality background information. For example, the specific reference image may be a long-term reference image. The long-term reference image includes multiple image blocks, and any one image block is taken from a decoded image. Different image blocks in the long-term reference image may be taken from different decoded images. When inter prediction is being performed, the long-term reference image can be referred to for the background part of the current image to be encoded/decoded, thereby reducing residual information of inter prediction and improving encoding/decoding efficiency.

In the embodiments of the present disclosure, the long-term reference image may be a long term reference frame in H.264/Advanced Video Coding (AVC) or H.265/High Efficiency Video Coding (HEVC) standards, or may be a background picture in the standards of Audio Video Coding Standard (AVS) 1-P2, AVS2-P2, Institute of Electrical and Electronics Engineers (IEEE) 1857.9-P4, etc., or may be a golden frame in standards such as VP8 and VP9, or may be the long-term reference image constructed from the image blocks extracted from multiple decoded images. This is not limited in the embodiments of the present disclosure.

The long-term reference image of each embodiment of the present disclosure may be an image that is not output.

In the techniques described above that use motion vector derivation, if motion search is performed in a long-term reference image during motion vector correction, the search efficiency and encoding/decoding efficiency will be reduced. This is because the long-term reference image is artificially constructed or is a specific reference image obtained long time ago in temporal sequence. There is no necessary spatial connection between the image blocks in the long-term reference image, and the edge of the image block has very obvious jumps. Searching motion vector based on such a long-term reference image has little significance. Pattern matching motion vector derivation (PMMVD) technology and decode motion vector refinement (DMVR) technology are both techniques that use motion vector derivation.

In some techniques described above that use bidirectional motion prediction, the motion vector is operated according to the temporal correlation of the image. When the reference image pointed to by the motion vector is a long-term reference image, the definition of temporal distance between the current image to be encoded or the current image to be decoded and the long-term reference image is not clear. As a result, these operations may fail. Bi-directional optical flow (BIO) prediction technology is a technology that uses bidirectional motion prediction.

The HEVC standard defines three modes of inter prediction: inter mode, merge mode, and skip mode. The purpose of inter prediction is to obtain a motion vector (MV), and then determine the position of the predicted image block in the reference image according to the motion vector. There are similarities in the motion patterns between neighboring image blocks. For example, the current image block (such as the image block to be encoded and/or the image block to be decoded) and the neighboring image block belong to the same object and move in the similar or same direction and distance while the lens moving. Therefore, it is not necessary to calculate the motion vector at most of the time, and the motion vector of the neighboring image block can be directly used as the motion vector of the current image block. In the merge mode and skip mode, the motion vector difference (MVD) is 0, that is, the motion vector is directly obtained according to the neighboring encoded image block or decoded image block.

When the mode of the image block to be encoded and/or the image block to be decoded is the merge mode, the implementation principle is as follows. A motion vector prediction (MVP) candidate list is constructed from neighboring image blocks and an optimal MVP is selected from the MVP candidate list as the motion vector of the current image block. Then the position of the predicted image block is determined according to the motion vector and the residual can be calculated after the predicted image block is determined. In the merge mode, the motion vector is selected from the MVP candidate list, so there is no MVD. The encoding end only needs to encode the residuals and index of the selected motion vector in the MVP candidate list, and does not need to encode the MVD. The decoding end can construct an MVP candidate list according to a similar method, and then obtain the motion vector according to the index transmitted from the encoding end. The decoding end determines the predicted image block according to the motion vector, and then obtains the current image block by decoding along with the residual.

The specific workflow at the encoding end in the merge mode is as follows.

1. Obtain the MVP candidate list.
2. Select the optimal MVP from the MVP candidate list and obtain the index of the optimal MVP in the MVP candidate list.
3. Use the selected MVP as the motion vector of the current image block.
4. Determine the predicted image block from the reference image based on the motion vector.
5. Obtain the residual by subtracting the predicted image block from the current image block.
6. Send only the residual and the index of the selected MVP in the MVP candidate list to the decoding end because the motion vector is selected from the MVP candidate list and hence there is no MVD.

The specific workflow at the decoding end in the merge mode is as follows.

1. Receive the residual and the index of motion vector in the MVP candidate list.
2. Obtain the MVP candidate list.
3. According to the index, find the motion vector in the MVP candidate list as the motion vector of the current image block.
4. Determine the predicted image block according to the motion vector, and then obtain the current image block by decoding along with the residual.

The above is the general processing of the merge mode.

The skip mode is a special case of merge mode. After the motion vector is obtained according to the merge mode, if the encoder determines according to a certain method that the current image block and the predicted image block are basically the same, there is no need to transmit the residual data. Only the index of the motion vector in the MVP candidate list and an identifier indicating that the current image block can be directly obtained from the predicted image block need to be sent.

In the inter mode, the MVP is determined first, and the MVP is corrected to obtain the MVD. At the encoding end, not only the index and the residual, but also the MVD, need to be transmitted to the decoding end. Advanced motion vector prediction (AMVP) is a tool for achieving motion vector prediction through a competitive mechanism.

There is also an MVP candidate list in the AMVP mode. The motion vectors in the MVP candidate list are obtained from neighboring blocks in the spatial or time domain of the current image block. The MVP candidate list in the AMVP mode may be different from the MVP candidate list in the merge mode. At the encoding end or decoding end, the optimal MVP is selected from the MVP candidate list. This MVP is used as the starting point for searching, and an optimal motion vector is obtained by searching around the MVP. This optimal motion vector is the motion vector of the current image block. The position of the predicted image block is determined according to the motion vector, and then the residual can be calculated after the predicted image block is determined. Further, the MVP is subtracted from MV to obtain MVD. At the encoding end, the residual, the index of the MVP in the MVP candidate list, and the MVD are encoded and sent to the decoding end. At the decoding end, an MVP candidate list can be constructed according to a similar method, and then the MVP can be obtained according to the index sent from the encoding end. The MV is determined at the decoding end according to the MVP and MVD, and the predicted image block is determined according to the MV. Then the current image block is obtained by decoding along with the residual.

The specific workflow at the encoding end in the AMVP mode is as follows.

1. Obtain the MVP candidate list.
2. Select the optimal MVP from the MVP candidate list and obtain the index of the MVP in the MVP candidate list.
3. Determine the starting point for searching according to MVP.
4. Search near the starting point to obtain the optimal motion vector.
5. Determine the predicted image block from the reference image based on the motion vector.
6. Obtain the residual by subtracting the predicted image block from the current image block.
7. Subtract MVP from motion vector to obtain MVD.
8. Send the residual, the index of the selected MVP in the MVP candidate list and the MVD to the decoding end.

The specific workflow of the decoding end in the AMVP mode is not described in detail here.

FIG. 1 is a schematic flowchart of the image processing method 100 according to an embodiment of the present disclosure. As shown in FIG. 1, at 110, an initial motion vector of a current image block is obtained.

At 120, when the reference image pointed to by the initial motion vector is a long-term reference image, a motion compensation is performed on the current image block based on the initial motion vector.

At 130, when the reference image pointed to by the initial motion vector is a short-term reference image, the initial motion vector is corrected to obtain a corrected motion vector, and a motion compensation is performed on the current image block based on the corrected motion vector.

Consistent with the present disclosure, if the initial motion vector points to a long-term reference image, the motion compensation is directly performed. If the initial motion vector points to a short-term reference image, the initial motion vector is corrected and then the motion compensation is performed based on the corrected motion vector. Therefore, a meaningless search due to an obvious jump at the edge of the image block of the long-term reference image can be avoided. As a result, the encoding and decoding efficiencies are improved.

In some implementations, the image processing method 100 according to embodiments of the present disclosure may be applied to the PMMVD technology.

PMMVD technology is a special merge mode based on Frame Rate Up Conversion (FRUC) technology. In this special merge mode, the motion information of the current image block (such as MV and MVD) is not encoded in the stream, but generated directly at the decoding end.

In some embodiments, the process at 130, i.e., when the reference image pointed to by the initial motion vector is a short-term reference image, correcting the initial motion vector to obtain a corrected motion vector and performing motion compensation on the current image block based on the corrected motion vector, may include obtaining a motion vector candidate list of the current image block, where the reference image pointed to by any candidate motion vector in the motion vector candidate list is a short-term reference image, determining the initial motion vector based on the motion vector candidate list, correcting the initial motion vector to obtain a corrected motion vector, and performing motion compensation on the current image block based on the corrected motion vector.

In this implementation manner, the initial motion vector is determined from the motion vector candidate list, and the reference image pointed to by the candidate motion vector in the motion vector candidate list is a short-term reference image. The initial motion vector is corrected to obtain the corrected motion vector, and then a motion compensation is performed on the current image block based on the corrected motion vector. Therefore, a meaningless search due to an obvious jump at the edge of the image block of the long-term reference image can be avoided. As a result, the encoding and decoding efficiencies are improved.

In some embodiments, obtaining the motion vector candidate list of the current image block may include determining candidate motion vectors for adding to the motion vector candidate list and, when the reference image pointed to by the candidate motion vector is a short-term reference image, adding the candidate motion vector to the motion vector candidate list.

In some embodiments, the method 100 may further include determining that the reference image pointed to by the candidate motion vector is a short-term reference image based on the frame identifier of the reference image pointed to by the candidate motion vector. In some embodiments, it may be determined whether the reference image pointed to by the candidate motion vector is a long-term reference image based on the frame identifier of the reference image pointed to by the candidate motion vector. If the reference image pointed to by the candidate motion vector is a long-term reference image, the candidate motion vector corresponding to the long-term reference image may not be added to the motion vector candidate list. In this way, when the initial motion vector is selected from the motion vector candidate list, the motion vector corresponding to the long-term reference image will not be selected.

The motion vector in the embodiments of the present disclosure includes three parameters: a horizontal component $v_x$, a vertical component $v_y$, and a frame identifier of the reference image pointed to. For example, the frame identifier may be a Picture Order Count (POC), or an identifier of another form. The encoding end and the decoding end can determine the attribute of the reference image through the frame identifier and determine whether the reference image is a long-term reference image or a short-term reference image.

In some embodiments, determining the initial motion vector based on the motion vector candidate list may include determining whether the selected initial motion vector is a motion vector pointing to a long-term reference image. If at least one selected initial motion vector points to a long-term reference image, a different initial motion vector is selected. This process is repeated until the selected initial motion vector points to a reference image that is a reference image other than a long-term reference image.

In some embodiments, if the initial motion vector determined based on the motion vector candidate list points to a long-term reference image, a candidate motion vector may be selected again from the motion vector candidate list according to a preset rule and used as an initial motion vector. The preset rule may be, for example, to select a candidate motion vector with the second lowest matching cost. If the candidate motion vector does not point to a long-term reference image, the candidate motion vector is used as the initial motion vector. This embodiment is only an example, not a limitation to the present disclosure.

For example, at the encoding end, the motion vector derivation process in FRUC merge mode is divided into two steps. The first step is a motion search at a coding unit (CU) level, and the second step is a motion refinement process at a sub-CU level. The similar functions of the encoding end can also be implemented at the decoding end.

In CU-level motion search, a CU-level motion vector candidate list is generated. Based on the bidirectional matching method, a motion vector with the lowest matching cost from the CU-level motion vector candidate list is found, such as MV-A. Based on the template matching method, a motion vector with the lowest matching cost from the CU-level motion vector candidate list is also found, such as MV-B. Then, based on the Rate Distortion Cost (RD-Cost) strategy used in the merge mode decision making process, the decision is made as to whether the current CU uses the FRUC merge mode. That is, the RD-Cost strategy is used to check the results of two matching methods (bidirectional matching method and template matching method). The results obtained by the matching method with a lower matching cost are further compared with the results from other CU modes. If the matching method with the lower matching cost in the two matching methods is the one with the lowest final matching cost, the FRUC identifier of the current CU is set to true, and the decoding end is instructed to use the corresponding matching method.

In this specific implementation manner, the CU-level motion vector candidate list may correspond to the motion vector candidate list in the method 100 described above. When the motion vector candidate list is being generated, a traversal can be performed on the motion vectors to be added to the list. When the motion vector points to the short-term reference image, the motion vector is added to the motion vector candidate list. When the motion vector points to the long-term reference image, the motion vector is discarded without being added to the motion vector candidate list. The motion vector candidate list may include at least one of the following candidate motion vectors: an original AMVP candidate motion vector obtained relative to the short-term reference frame if the current image block is under the advanced motion vector prediction (AMVP) mode, a merged candidate motion vector obtained relative to the short-term reference frame, a motion vector obtained by interpolation from the short-term reference frame, and an upper neighboring motion vector and a left neighboring motion vector of the current block relative to the short-term reference frame. The motion vector candidate list may be used as a CU-level motion vector candidate list.

Determining the initial motion vector based on the motion vector candidate list may include determining the distortion cost corresponding to the candidate motion vector in the motion vector candidate list based on the bidirectional matching method and/or template matching method, and using the motion vector with the lowest distortion cost in the candidate list as the initial motion vector.

In some embodiments, at the encoding end, determining the initial motion vector based on the motion vector candidate list may correspond to a CU-level motion search. In the CU-level motion search, a motion vector with the lowest matching cost is found from the CU-level motion vector candidate list based on the bidirectional matching method, such as MV-A, and a motion vector with the lowest matching cost is also found from the CU-level motion vector candidate list based on the template matching method, such as MV-B. Then, based on the RD-Cost strategy used in the merge mode decision making process, the decision is made as to whether the current CU uses the FRUC merge mode. That is, the RD-Cost strategy is used to check the results of two matching methods (bidirectional matching method and template matching method). The results obtained by the matching method with a lower matching cost are further compared with the results from other CU modes. If the matching method with the lower matching cost in the two matching methods is the one with the lowest final matching cost, the FRUC identifier of the current CU is set to true, and the decoding end is instructed to use the corresponding matching method. The similar functions of the encoding end can also be implemented at the decoding end, but the decoding end is not as complicated as the encoding end. For example, the decoding end directly receives the identifier indicating the matching mode at the encoding end without performing RD-Cost decision making process.

In some embodiments, correcting the initial motion vector to obtain the corrected motion vector may include generating a sub-motion vector candidate list for the current image block and determining a motion vector with the lowest distortion cost in the sub-motion vector candidate list as the corrected motion vector. The sub-motion vector candidate list includes the initial motion vector.

In some embodiments, correcting the initial motion vector to obtain the corrected motion vector may correspond to sub-CU-level motion refinement.

The motion vector with the smallest matching cost in the CU-level motion search is the initial motion vector, which is used as a starting point for sub-CU-level motion refinement. A local search is performed around the starting point based on the matching method (bidirectional matching method or template matching method) determined at the CU level. In some embodiments, in sub-CU-level motion refinement, a sub-CU-level motion vector candidate list may be generated. A motion vector with a low matching cost is found in the sub-CU-level motion vector candidate list as the motion vector of the current CU.

The sub-CU-level motion vector candidate list includes the following motion vectors: a motion vector determined from a CU-level motion search, the top neighboring motion vector, the left neighboring motion vector, the top left neighboring motion vector, and the top right neighboring motion vector of the current image block, the scaled version of a collocated motion vector at the corresponding position of the current image block in the reference image, and other candidate motion vectors derived from the time domain (up to 4 ATMVP candidates and up to 4 STMVP candidates).

In the above specific implementation, if the reference image pointed to by the candidate motion vector is a long-term reference image, the candidate motion vector corresponding to the long-term reference image is not added to the CU-level motion vector candidate list, so that the candidate motion vector corresponding to the long-term reference image does not have the opportunity to become an initial motion vector.

In another specific implementation, if the initial motion vector determined based on the CU-level motion vector candidate list points to a long-term reference image, another candidate motion vector may be selected from the CU-level motion vector candidate list as the initial motion vector according to a preset rule. The preset rule may be, for example, to select a candidate motion vector with the second lowest matching cost. If the candidate motion vector does not point to a long-term reference image, the candidate motion vector is used as the initial motion vector.

Figure 2:
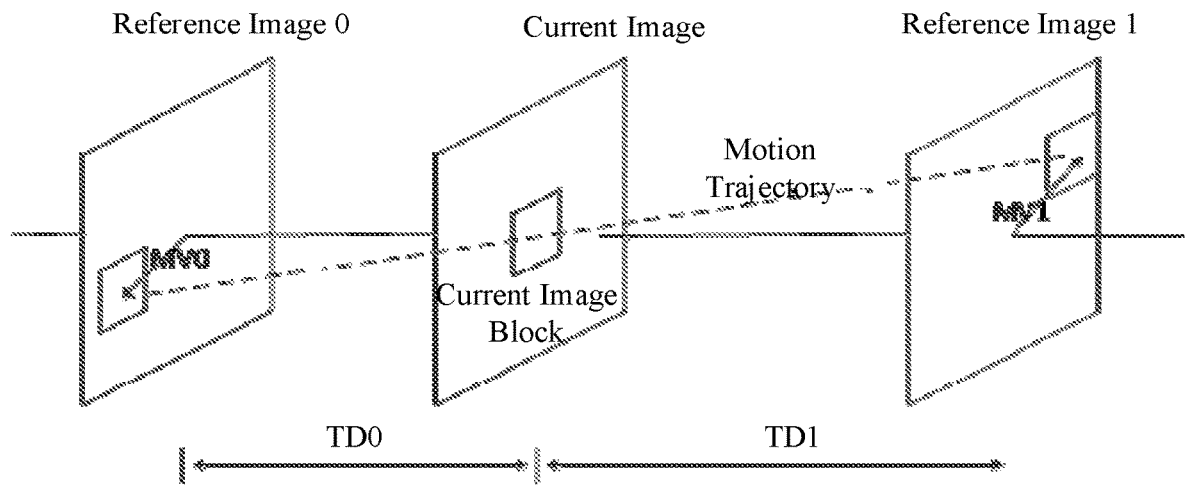
FIG. 2 is a schematic diagram showing the principle of the bidirectional matching method according to an embodiment of the disclosure.

FIG. 2 is a schematic diagram showing the principle of a bidirectional matching method according to an embodiment of the present disclosure. As shown in FIG. 2, with the bidirectional matching method, the closest match between two predicted image blocks in different reference images on the motion trajectory of the current CU is found and the motion vector of the current CU is derived. The bidirectional matching method is based on the assumption that the motion trajectory of the current image block is continuous. The motion vectors MV0 and MV1 of the two predicted image blocks should be proportional to the time-domain distance (TD0 and TD1) between the current image and the two reference images (reference image 0 and reference image 1). For example for MV0, a motion vector pair of MV0 and MV1 can be generated by traversing the motion vector candidate list. Among them, MV1 can be generated according to MV0, TD0, and TD1. If the two predicted image blocks pointed to by the motion vector pair corresponding to MV0 have the least distortion therebetween, the motion vector (i.e., MV0) is the motion vector of the current CU. When TD0=TD1, the bidirectional matching method becomes a bidirectional matching method based on mirroring.

When any one of the two reference images is a long-term reference image, since the temporal distance between the current image (the current image to be encoded or the current image to be decoded) and the long-term reference image is not clearly defined, the bidirectional matching method cannot be performed. Further, because the long-term reference image is artificially constructed or is a specific reference image obtained long time ago in temporal sequence, there is no necessary spatial connection between the image blocks in the long-term reference image. Therefore, the edge of the image block has very obvious jumps and searching motion vectors based on such a long-term reference image has little significance. In some embodiments of the present disclosure, the candidate motion vector corresponding to the long-term reference image is not added to the CU-level motion vector candidate list, thereby avoiding the above problem.

Figure 3:
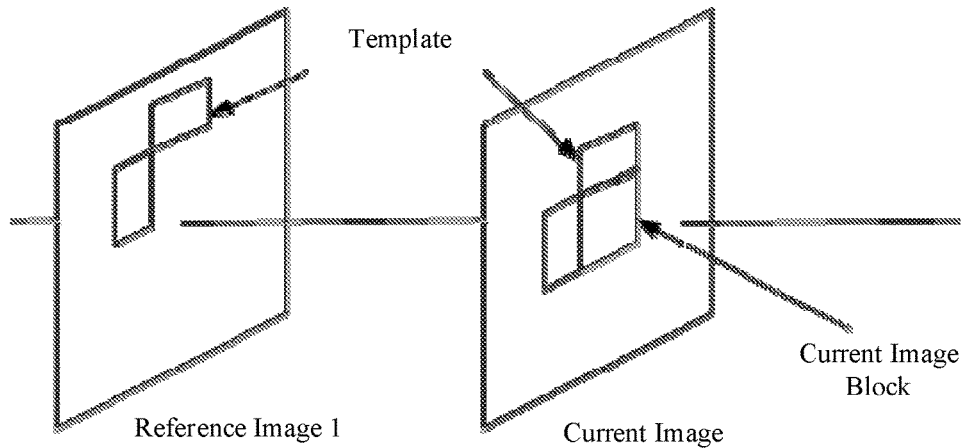
FIG. 3 is a schematic diagram showing the principle of the template matching method according to an embodiment of the disclosure.

FIG. 3 is a schematic diagram showing the principle of the template matching method according to an embodiment of the present disclosure. As shown in FIG. 3, with the template matching method, the closest match between the template of the current image (the upper image block and/or the left image block of the current CU) and the block in the reference image (same size as the template) is found, and the motion vector of the current CU is derived. After the template is obtained, when the distortion between the template and the predicted image block pointed to by the candidate motion vector is minimal, the candidate motion vector is the motion vector of the current CU.

When the reference image is a long-term reference image, since the long-term reference image is artificially constructed or is a specific reference image obtained long time ago in temporal sequence, there is no necessary spatial connection between the image blocks in the long-term reference image. Therefore, the edge of the image block has very obvious jumps and searching motion vectors based on such a long-term reference image has little significance. That is, the result of the template matching method is inaccurate or even meaningless. In some embodiments of the present disclosure, the candidate motion vector corresponding to the long-term reference image is not added to the CU-level motion vector candidate list, thereby avoiding the above problem.

In a specific implementation, the image processing method 100 according to the embodiment of the present disclosure may be applied to the DMVR technology.

The DMVR technology is a refinement technology used for more accurate prediction of a current image block during a bidirectional prediction. The DMVR technology is described in detail in the following with the decoding end as an example. DMVR technology mainly includes two major steps. In the first step, a template is constructed based on decoded image blocks corresponding to multiple initial motion vectors. In the second step, the multiple initial motion vectors are corrected based on the template.

In some embodiments, a motion vector candidate list can be generated at the decoding end. For example, the motion vector candidate list may be the motion vector candidate list of the AMVP mode described above or the motion vector candidate list of the merge template. The decoding end may receive multiple indexes sent by the encoding end to indicate the initial motion vector. The decoding end obtains multiple initial motion vectors from the motion vector candidate list according to indexes. The decoding end may generate a template based on the decoded image blocks corresponding to the multiple initial motion vectors (for example, a method of weighted summation of pixels), and use the generated template to correct the multiple initial motion vectors respectively. Finally, the motion compensation is performed on the current image block based on the corrected motion vector.

In this specific embodiment, the initial motion vector may include a first initial motion vector and a second initial motion vector. When there is a long-term reference image in the initial motion vectors, the following processing may be adopted. The process at 120, i.e., when the reference image pointed to by the initial motion vector is a long-term reference image, performing motion compensation on the current image block based on the initial motion vector, may include performing motion compensation on the current image block based on the first initial motion vector and the second initial motion vector when at least one of the first initial motion vector or the second initial points to a long-term reference image, and when the reference images pointed to by the first initial motion vector and the second initial motion vector are both short-term reference images, correcting the first initial motion vector and the second initial motion vector to obtain the corrected first motion vector and the corrected second motion vector and performing the motion compensation on the current image block based on the corrected first motion vector and the corrected second motion vector. When there is no long-term reference image in the initial motion vector, that is, the initial motion vectors are all short-term reference images, the existing DMVR processing method may be used.

Figure 4:
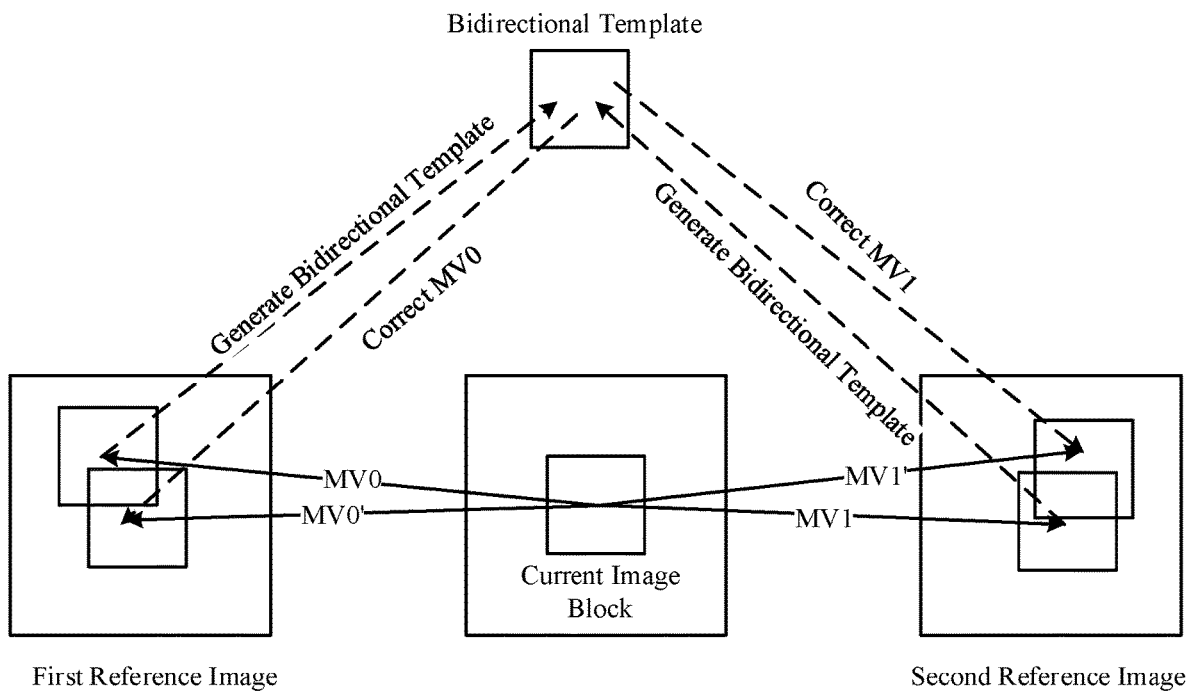
FIG. 4 is a schematic diagram showing the principle of the DMVR technology according to an embodiment of the disclosure.

FIG. 4 is a schematic diagram showing the principle of the DMVR technology according to an embodiment of the present disclosure. In some embodiments, it is assumed that the initial motion vector includes a first initial motion vector (for example, MV0), and a second initial motion vector (for example, MV1). The decoded image block corresponding to the first initial motion vector belongs to the first decoded image block of the first frame, and the first frame can be a first reference image and the first decoded image block can be a first reference image block. The decoded image block corresponding to the second motion vector belongs to the second decoded image block of the second frame, and the second frame can be the second reference image and the second decoded image block can be the second reference image block. A weighted summation is performed to the first reference image block and the second reference image block to obtain a template. The template may be called a bidirectional template.

In some embodiments, the initial motion vector includes a first initial motion vector and a second initial motion vector. Correcting the first initial motion vector and the second initial motion vector to obtain the corrected first motion vector and the corrected second motion vector may include generating a template based on the first reference image block and the second reference image. The first reference image block corresponds to the first initial motion vector and belongs to the first reference image, and the second reference image block corresponds to the second initial motion vector and belongs to the second reference Image. Based on the template, the first initial motion vector and the second initial motion vector are corrected to obtain a corrected first motion vector and a corrected second motion vector.

In some embodiments, correcting the first initial motion vector and the second initial motion vector based on the template to obtain the corrected first motion vector and the corrected second motion vector may include using N third reference image blocks to match with the template, where N is a positive integer. The N third reference image blocks correspond to N third initial motion vectors and belong to the first reference image. Then, M fourth references image blocks are matched with the template, where M is a positive integer. The M fourth reference image blocks correspond to M fourth initial motion vectors and belong to the second reference image. Based on the matching result, one third initial motion vector is selected from the N third initial motion vectors, and one fourth initial motion vector is selected from the M fourth initial motion vectors. The one third initial motion vector and the one fourth initial motion vector are used as the motion vectors of the current image block (that is, the corrected first motion vector and the corrected second motion vector) or are used to determine the motion vector of the current image block.

In some embodiments, the selected third initial motion vector may be the motion vector with the lowest distortion cost. In some other embodiments, the selected third initial motion vector may be a motion vector with a distortion cost less than a certain value.

In some embodiments, the selected fourth initial motion vector may be the motion vector with the lowest distortion cost. In some other embodiments, the selected fourth initial motion vector may be a motion vector with a distortion cost less than a certain value.

The one third initial motion vector and the one fourth initial motion vector are used as the motion vector of the current image block. A weighted summation is performed to the known image blocks (i.e., the initial predicted image block) corresponding to the one third initial motion vector and the one fourth initial motion vector to obtain the predicted image block.

In some embodiments, the one third initial motion vector and the one fourth initial motion vector may be used to determine the motion vector of the current image, that is, the one third initial motion vector and the one fourth initial motion vector can be used as MVP respectively. At this time, the third MVP may be used as a starting point to perform search optimization to obtain an optimized motion vector, and the fourth MVP may be used as a starting point to perform search optimization to obtain another optimized motion vector. A weighted summation is performed to the known image blocks (i.e., the initial predicted image blocks) corresponding to the two optimized motion vectors to obtain the predicted image blocks.

In some embodiments, N and M may be equal.

In some embodiments, the third initial motion vector includes the first initial motion vector, and the fourth initial motion vector includes the second initial motion vector. That is, the reference image block corresponding to the first initial motion vector and the reference image block corresponding to the second motion vector, which are used to generate the template, need to be matched with the template respectively.

In some embodiments, at least some initial motion vectors among the N third initial motion vectors are obtained by offsetting based on the first initial motion vector, and at least some initial motion vectors among the M fourth initial motion vector are obtained by offsetting based on the second initial motion vector.

For example, the initial motion vectors other than the first initial motion vector among the N third initial motion vectors may be obtained by offsetting based on the first initial motion vector. For example, N may be equal to 9, and 8 initial motion vectors may be obtained by offsetting based on the first initial motion vector. For example, it may be obtained by offsetting in eight directions, or by offsetting by different numbers of pixels in the vertical direction or the horizontal direction.

For another example, the initial motion vectors other than the second initial motion vector among the M fourth initial motion vectors may be obtained by offsetting based on the second initial motion vector. For example, M may be equal to 9, and 8 initial motion vectors may be obtained by offsetting based on the second initial motion vector. For example, it may be obtained by offsetting in eight directions, or by setting by different numbers of pixels in the vertical direction or the horizontal direction.

In some embodiments, the first reference image may be a forward frame of the current image block, and the second reference image may be a backward frame of the current image block. In some other embodiments, the first reference image may be a forward frame of the current image block, and the second reference image may be a forward frame of the current image block.

In a specific implementation, the decoding end generates a motion vector candidate list, and receives two indexes sent by the encoding end that indicate the initial motion vectors. The decoding end determines the DMVR condition, which requires that the two initial motion vectors (such as MV0 and MV1) both do not point to the long-term reference image, and the prediction directions of the two initial motion vectors are opposite, that is, one should be forward and the other one is backward. When the DMVR condition is met, a weighted summation is performed to the image block corresponding to MV0 and the image block corresponding to MV1 to generate a bidirectional template.

In some embodiments of the present disclosure, the candidate motion vector corresponding to the long-term reference image is not added to the motion vector candidate list, thereby avoiding that the reference images pointed to by the initial motion vectors indicated by the two indexes are long-term reference images. In some other embodiments, if the reference images pointed to by the initial motion vectors indicated by the two indexes are long-term reference images, the decoding end may request the encoding end to re-instruct a motion vector that does not point to the long-term reference image as the initial motion vector or the decoding end returns or marks the failure of the DMVR algorithm.

In the first reference image, the image block corresponding to MV0 is shifted in the horizontal direction and/or the vertical direction by one pixel to find the motion vectors of the 8 neighboring image blocks. The 9 motion vectors in total (MV0 and the 8 motion vectors found) form a reference list: list0. In the second reference image, the image block corresponding to MV1 is shifted in the horizontal direction and/or vertical direction by one pixel to find the motion vectors of the 8 neighboring image blocks. The 9 motion vectors in total (MV1 and the 8 motion vectors found) form a reference list: list1.

The bidirectional template matching method is used by the decoding end to perform a distortion-based search between the bidirectional template and the reconstructed block in the reference image, and finally a refined motion vector without additional motion information is obtained. For the motion vectors in the two reference images (the motion vector in list0 and the motion vector in list1), the motion vector with the smallest matching cost will be used as the updated motion vector to replace the original motion vector. Eventually, two new motion vectors (MV0' and MV1' shown in FIG. 4) will replace the original MV0 and MV1. According to the predicted image block corresponding to MV0' and the predicted image block corresponding to MV1', a final bidirectional prediction result is generated.

In the DMVR technology, when the reference image is a long-term reference image, since the long-term reference image is artificially constructed or is a specific reference image obtained long time ago in temporal sequence, there is no necessary a spatial connection between the image blocks in the long-term reference image. Therefore, the edge of the image block has very obvious jumps and searching motion vectors based on such a long-term reference image has little significance. That is, the DMVR technology is inaccurate or even meaningless. In some embodiments of the present disclosure, the motion vector corresponding to the long-term reference image is no longer refined, and is directly used for motion compensation, thereby avoiding the above problems.

FIG. 5 is a schematic flowchart of an image processing method 200 according to another embodiment of the present disclosure. As shown in FIG. 5, at 210, a first initial motion vector and a second initial motion vector are obtained. The first initial motion vector points to a first reference image, and the second initial motion vector points to a second reference image.

At 220, when at least one of the first reference image or the second reference image is a long-term reference image, a predicted image block of the current image block is calculated based on the first initial motion vector and the second initial motion vector.

At 230, when the first reference image and the second reference image are both short-term reference images, the motion vector of the current image block is calculated based on the gradients at the pixels pointed to by the first initial motion vector and the second initial motion vector, and a predicted image block of the current image block is calculated based on the motion vector of the current image block.

In the image processing method according to some embodiments of the present disclosure, when the reference images pointed to by the two initial motion vectors are both short-term reference images, the gradient values of the pixels and the optimization principle are used to calculate the motion vector of the current image block, and then a predicted image block of the current image block is calculated. When at least one of the reference images pointed to by the two initial motion vectors is a long-term reference image, the predicted image block of the current image block is directly calculated based on the two initial motion vectors. Therefore, the prediction failure due to the unclear definition of the temporal distance between the current image and the long-term reference image can be avoided. As a result, the coding efficiency is improved.

In some embodiments, the process at 230, i.e., calculating the MV of the current image block according to the gradient values of the pixels pointed to by the first initial MV and the second initial MV, may include calculating the MV of the current image block according to the gradient values of the pixels pointed to by the first initial MV and the second initial MV, and the optimization principle.

In a specific implementation, the image processing method 200 according to an embodiment of the present disclosure may be applied to improve the bidirectional motion prediction mode. The bidirectional motion prediction mode means that when a current image block is being encoded, two initial predicted image blocks from two different reference images are both used to predict the current image block, and then the two initial predicted image blocks are merged into one image block to be used as the predicted image block of the current image block. BIO prediction technology is a technology using the bidirectional motion prediction mode. With the BIO prediction technology, motion vectors do not have more coding identifiers than ordinary bidirectional motion prediction modes, but the process of deriving predicted image blocks is different. The BIO prediction technology is a motion optimization based on the block motion compensation. The motion vector is calculated with the optical flow model, which is the motion optimization at the sampling point level.

The BIO prediction technology according to embodiments of the present disclosure may include two steps. The first step is to calculate the MV of the current image block according to the two initial MVs (such as the first initial MV and the second initial MV). In some embodiments, the MV of the current image block is calculated according to the gradient values of the pixels pointed to by the first initial MV and the second initial MV, and the optimization principle. The second step is to calculate the predicted image block of the current image block according to the MV of the current image block, the first reference image block pointed to by the first initial MV, and the second reference image block pointed to by the second initial MV. In some embodiments, the BIO prediction technology interpolates the two reference image blocks pointed to by the two initial MVs to obtain two initial predicted image blocks of the same size as the current image block, and then weights and merges the two initial predicted image blocks into the predicted image block of the current image block.

FIG. 6 is a schematic diagram showing the principle of the BIO technology according to an embodiment of the present disclosure. The BIO technology assumes that within a short period of time, an object moves at a constant speed in both the horizontal and vertical directions, which meets the conditions of optical flow analysis. As shown in FIG. 6, it can be assumed that the motion vectors $(v_x, v_y)$ and the brightness values $I^{(k)}$ of the reference points k (k=0,1) pointed to by the two initial MVs satisfy the following optical flow formula:

$$\partial I^{(k)}/\partial t + v_x \partial I^{(k)}/\partial x + v_y \partial I^{(k)}/\partial y = 0. \quad \text{Formula 1}$$

where, $\partial I^{(k)}/\partial x$ and $\partial I^{(k)}/\partial y$ are the horizontal and vertical components of the gradient value.

The optical flow formula and Hermite interpolation are combined to obtain the following polynomial, which is the predicted value of BIO when t=0.

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad \text{Formula 2}$$

where, $\tau_0$ and $\tau_1$ represent the distances from the current image to the reference image 0 and to the reference image 1, respectively. Both distances can be calculated through the POC of the current image and the two reference images.

$$\tau_0 = \text{POC(current)} - \text{POC(Ref}_0) \quad \text{Formula 3}$$

$$\tau_1 = \text{POC(Ref}_1) - \text{POC(current)} \quad \text{Formula 4}$$

where, POC(current) is the image serial number of the current image, POC(Re $f_0$) is the image serial number of the reference image 0, and POC(Re $f_1$) is the image serial number of the reference image 1.

In some embodiments, the reference images can be in different directions, that is, one from the past and one from the future. In some embodiments, the two reference images can be in the same direction, that is, both from the past or both from the future. If the two reference images are in the same direction, then $\tau_0$ and $\tau_1$ are of opposite signs. In this case, the two reference images cannot be the same, that is, $\tau_0 \neq -\tau_1$. If there is non-zero motion $(MV_{x0}, MV_{y0}, MV_{x1}, MV_{y1} \neq 0)$ in the reference area, the motion vector is proportional to the time-domain distance $(MV_{x0}/MV_{x1} = MV_{y0}/MV_{y1} = -\tau_0/\tau_1)$.

It is assumed that the motion in a small area is the same, so the motion vector of BIO can be obtained to satisfy the following first-order Taylor expansion formula:

$$\Delta = (I^{(0)} - I^{(1)} + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad \text{Formula 5}$$

where, $\Delta$ is the first-order Taylor expansion of the pixel difference between the two reference points in the two corresponding reference images (such as points A and B in FIG. 6). Through the analysis of gradient values and optimization methods, the best motion vector of the current image block has the minimum sum of squares $\Delta$ in the entire area, from which the best motion vector $(v_x, v_y)$ can be calculated. Considering the robustness of the algorithm, $v_x$ and $v_y$ should be within a certain threshold.

According to the above formula, the BIO prediction technology is as follows. For a current image block, the pixel values at the positions corresponding to the two reference images are already obtained. In the formula, $I^{(0)}$ and $I^{(1)}$ represent the pixel values in the two reference images respectively, $I^{(0)}$, $I^{(1)}$, $\tau_0$ and $\tau_1$ are known in the above formula, the horizontal and vertical components of the gradient values can be calculated in the reference image, and the unknown parameters are $v_x$, $v_y$ and $\Delta$. For all pixels in an area, one $\Delta$ can be calculated. With the optimization method, the $v_x$ and $v_y$ that give Δ the minimum values are the required optimal motion vector. When $v_x$ and $v_y$ are calculated, intervals are given to $v_x$ and $v_y$ respectively. The threshold of each interval is determined by the direction of the two reference images relative to the current image. After the optimal motion vector is obtained, instead of directly taking the image block pointed to by the optimal motion vector plus residual as the current image block, each pixel of the current image block is calculated with Formula 2 and is also called BIO prediction value. Then a predicted image block is formed by combining the predicted values of various pixels together.

In some embodiments of the present disclosure, obtaining the predicted image block of the current image block through the calculation based on the first initial motion vector and the second initial motion vector includes performing a weighted summation to the first reference image block pointed to by the first initial motion vector and the second reference image block pointed to by the second initial motion vector to obtain the predicted image block of the current image block.

In some embodiments, a judgment condition is added before the BIO prediction starts, or a necessary condition is added to the BIO conditions. If it is determined that both the first reference image pointed to by the first initial motion vector and the second reference image pointed to by the second initial motion vector are not long-term reference images and the original BIO conditions are met, then the BIO prediction can be performed. Otherwise, the predicted image block of the current image block is directly calculated based on the two initial motion vectors, or the BIO prediction algorithm is returned or marked as invalid.

The BIO conditions may further include that the first initial motion vector and the second initial motion vector have different prediction directions. In some embodiments, the BIO conditions may further include that the first initial motion vector and the second initial motion vector have the same prediction direction, neither the first initial motion vector nor the second initial motion vector is equal to 0, and the first reference image and the second reference image are different. Further, the ratio of components on each direction of the first initial motion vector and the second initial motion vector is the same, which is equal to the ratio of the distance between the first reference image pointed to by the motion vector and the current image and the distance between the second reference image pointed to by the motion vector and the current image.

The motion vector in the embodiments of the present disclosure includes three parameters: a horizontal component $v_x$, a vertical component $v_y$, and a frame identifier of the reference image pointed to. For example, the frame identifier may be a POC or an identifier of another form. The encoding end and the decoding end can determine the attributes of the reference image through the frame identifier and determine whether the reference image is a long-term reference image.

In some embodiments of the present disclosure, determining whether the reference image pointed to by the initial motion vector is a long-term reference image may include determining whether the reference image pointed to by the initial motion vector is a long-term reference according to the frame identifier of the reference image pointed to by the initial motion vector.

In some embodiment of the present disclosure, a process at 230, i.e., calculating the predicted image block of the current image block according to the motion vector of the current image block may include calculating the predicted image block of the current image block according to the motion vector of the current image block, and the first reference image block pointed to by the first initial motion vector and the second reference image block pointed to by the second initial motion vector. The specific calculation formula has been described in detail earlier and will not be repeated here.

A specific implementation of the method 200 may include the following processes.

1. It is determined whether the current two initial motion vectors meet the BIO conditions. The conditions are as follows:

a) The reference images pointed to by the two initial motion vectors are both short-term reference images, that is, the first reference image pointed to by the first initial motion vector and the second reference image pointed to by the second initial motion vector are both short-term reference images.

b) Meet one of the following two conditions:
  i) The two initial motion vectors are from different prediction directions (forward and backward respectively).
  ii) The two initial motion vectors are from different reference images in the same prediction direction, and both initial motion vectors are not equal to 0. The ratio of components on each direction of the two initial motion vectors is the same, which is equal to the ratio of the distance between the reference image pointed to by the motion vector and the current image.

The initial motion vectors satisfying both a) and b) meet the BIO conditions, then a BIO prediction can be performed.

2. According to the prediction directions of the two initial motion vectors, operation thresholds are determined, that is, the thresholds of the intervals of $v_x$ and $v_y$.

3. The gradient values of the pixels pointed to by the two initial motion vectors are calculated.

4. According to the gradient values and optimization principle, a best motion vector is calculated as the motion vector of the current image block.

5. A BIO prediction value is obtained according to the motion vector of the current image block and the reference image block pointed to by the two initial motion vectors.

If only b) i) is met, a weighted summation is performed to the first reference image block pointed to by the first initial motion vector and the second reference image block pointed to by the second initial motion vector to obtain the predicted image block of the current image block.

The principles, formulas and steps referred by the BIO prediction in the embodiments of the present disclosure can be referred to the above description, which will not be repeated here.

In the BIO prediction technology, when the reference image is a long-term reference image, since the temporal distance between the current image (the current image to be encoded or the current image to be decoded) and the long-term reference image is not clearly defined, the BIO prediction technology cannot be performed. In the embodiments of the present disclosure, when there is a long-term reference image among the reference images pointed to by the two initial motion vectors, the predicted image block of the current image block is directly calculated based on the two initial motion vectors, thereby the above problem is avoided.

The methods of the embodiments of the present disclosure can be applied to the encoding end and the decoding end. The current image block in each embodiment of the present disclosure can be an image block to be encoded or an image block to be decoded.

The embodiments of the present disclosure only provide examples of applying the image processing method to the PMMVD technology, DMVR technology, and BIO prediction technology. The methods of the embodiments of the present disclosure may also be applied to other video encoding/decoding technologies, which is not limited in the embodiments of this disclosure.

Figure 7:
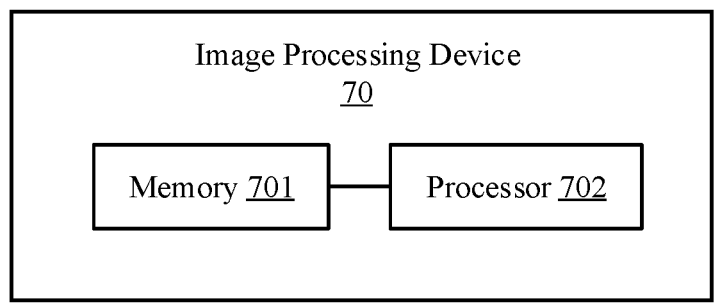
FIG. 7 is a schematic block diagram of an image processing device according to an embodiment of the disclosure.

FIG. 7 is a schematic block diagram of an image processing device 70 according to an embodiment of the disclosure. As shown in FIG. 7, the image processing device 70 includes at least one memory 701 for storing computer executable instructions and at least one processor 702, individually or collectively, being configured to access the at least one memory 701 and execute the computer executable instructions to implement the following operations: obtaining an initial motion vector MV of the current image block; performing motion compensation on the current image block based on the initial MV when the reference image pointed to by the initial MV is a long-term reference image; and correcting the initial MV to obtain a corrected MV when the reference image pointed to by the initial MV is a short-term reference image, and performing motion compensation on the current image block based on the corrected MV.

In some embodiments, the processor 702 is further configured to obtain an MV candidate list of the current image block, where the reference image pointed to by any candidate MV in the MV candidate list is a short-term reference image, determine the initial MV based on the MV candidate list, correct the initial MV to obtain a corrected MV, and perform motion compensation on the current image block based on the corrected MV.

In some embodiments, the processor 702 is further configured to determine candidate MVs for adding to the MV candidate list, and when the reference image pointed to by the candidate MV is a short-term reference image, add the candidate MVs to the MV candidate list.

In some embodiments, the processor 702 is further configured to determine that the reference image pointed to by the candidate MV is a short-term reference image based on the frame identifier of the reference image pointed to by the candidate MV.

In some embodiments, the MV candidate list includes at least one of the following candidate MVs: an original AMVP candidate MV obtained relative to the short-term reference frame if the current image block is under the advanced motion vector prediction (AMVP) mode, a merged candidate MV obtained relative to the short-term reference frame, a MV obtained by interpolation from short-term reference frames, and an upper neighboring MV and a left neighboring MV of the current block relative to the short-term reference frame.

In some embodiments, the processor 702 is further configured to determine a distortion cost corresponding to the candidate MV in the MV candidate list based on the bidirectional matching method and/or template matching method, and use the MV with the lowest distortion cost in the MV candidate list as the initial MV.

In some embodiments, the processor 702 is further configured to generate a sub-MV candidate list for the current image block and determine a MV with the lowest distortion cost in the sub-MV candidate list as the corrected MV. The sub-MV candidate list includes the initial MV.

In some embodiments, the initial MV includes a first initial MV and a second initial MV, the processor is further configured to perform motion compensation on the current image block based on the first initial MV and the second initial MV when at least one of the first initial MV or the second initial MV points to a long-term reference image, correct the first initial MV and the second initial MV to obtain a corrected first MV and a corrected second MV when the reference images pointed to by the first initial MV and the second initial MV are both short-term reference images, and perform the motion compensation on the current image block based on the corrected first MV and the corrected second MV.

In some embodiments, the processor 702 is further configured to generate a template based on a first reference image block and a second reference image block, where the first reference image block corresponds to the first initial MV and belongs to the first reference image, and the second reference image block corresponds to the second initial MV and belongs to the second reference image, and correct the first initial MV and the second initial MV based on the template to obtain a corrected first MV and a corrected second MV.

In some embodiments, the processor 702 is further configured to use N third reference image blocks to match with the template, where N is a positive integer, the N third reference image blocks correspond to N third initial MVs and belong to the first reference image, use M fourth reference image blocks to match with the template, where M is a positive integer, the M fourth reference image blocks correspond to M fourth initial MVs and belong to the second reference image, based on the matching result, select one third initial MV from the N third initial MVs and one fourth initial MV from the M fourth initial MVs, and use the one third initial MV and the one fourth initial MV as the MVs of the current image block or to determine the MVs of the current image block.

In some embodiments, the third initial MV includes the first initial MV, and the fourth initial MV includes the second initial MV.

In some embodiments, at least some initial MVs among the N third initial MVs are obtained by offsetting based on the first initial MV, and at least some initial MVs among the M fourth initial MVs are obtained by offsetting based on the second initial MV.

In some embodiments, N is equal to M.

In some embodiments, the first reference image is a forward frame of the current image block, and the second reference image is a backward frame of the current image block. In some other embodiments, the first reference image is a forward frame of the current image block, and the second reference image is a forward frame of the current image block.

The image processing device 70 may also be implemented by a corresponding software module, which is not repeated here.

Figure 8:
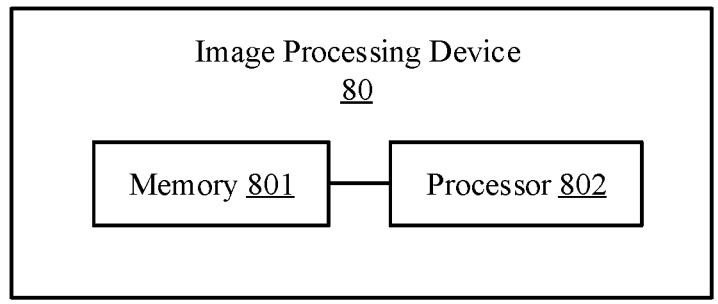
FIG. 8 is a schematic block diagram of an image processing device according to another embodiment of the disclosure.

FIG. 8 is a schematic block diagram of an image processing device 80 according to another embodiment of the disclosure. As shown in FIG. 8, the image processing device 80 includes at least one memory 801 for storing computer executable instructions and at least one processor 802, individually or collectively, being configured to access the at least one memory 801 and execute the computer executable instructions to implement the following operations: obtaining a first initial MV and a second initial MV, where the first initial MV points to a first reference image and the second initial MV points to a second reference image, calculating a predicted image block of the current image block based on the first initial MV and the second initial MV when at least one of the first reference image or the second reference image is a long-term reference image, calculating the MV of the current image block based on the gradient at the pixels pointed to by the first initial MV and the second initial MV when the first reference image and the second reference image are both short-term reference images, and calculating a predicted image block of the current image block based on the MV of the current image block.

In some embodiments, the processor 802 is further configured to calculate the MV of the current image block according to the gradient values of the pixels pointed to by the first initial MV and the second initial MV and the optimization principle.

In some embodiments, the processor 802 is further configured to obtain the predicted image block of the current image block by performing a weighted summation to the first reference image block pointed to by the first initial MV and the second reference image block pointed to by the second initial MV.

In some embodiments, the prediction directions of the first initial MV and the second initial MV are different.

In some embodiments, the prediction directions of the first initial MV and the second initial MV are the same. Neither the first initial MV nor the second initial MV is equal to 0, and the first reference image and the second reference image are different.

In some embodiments, the processor 802 is further configured to calculate the predicted image block of the current image block according to the MV of the current image block, the first reference image block pointed to by the first initial MV, and the second reference image block pointed to by the second initial MV.

The image processing device 80 may also be implemented by a corresponding software module, which is not repeated here.

The devices in the embodiments of the present disclosure may be implemented based on a memory and a processor. Each memory is used to store instructions for executing the method of the embodiments of the present disclosure. The processor executes the above instructions, so that the device executes the methods in the embodiments of the present disclosure.

The processor mentioned in the embodiments of the present disclosure may be a central processing unit (CPU), and may also be other general-purpose processor, a digital signal processor (DSP), an application specific integrated circuit (ASIC), a field programmable gate array (FPGA) or other programmable logic device, a discrete gate, a transistor logic device, or a discrete hardware component, etc. A general-purpose processor may be a microprocessor, or the processor may be any conventional processor.

The memory mentioned in the embodiments of the present disclosure may be a volatile memory or a non-volatile memory, or may include both volatile and non-volatile memory. Among them, non-volatile memory can be read-only memory (ROM), programmable read-only memory (PROM), erasable programmable read-only memory (EPROM), electronically erasable programmable read-only memory (EEPROM) or flash memory. The volatile memory may be a random access memory (RAM), which is used as an external cache. By way of example but not limitation, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchlink dynamic random access memory (SLDRAM), and direct rambus random access memory (DR RAM).

When the processor is a general-purpose processor, DSP, ASIC, FPGA or other programmable logic device, discrete gate or transistor logic device, or discrete hardware component, the memory (storage module) is integrated in the processor.

The memories described here are intended to include, but are not limited to these and any other suitable types of memories.

A computer-readable storage medium is also provided in the embodiments of the present disclosure to store instructions. When the instructions are run on the computer, the computer executes the methods in the above embodiments.

A computing device is further provided in the embodiments of the present disclosure. The computing device includes the computer-readable storage medium described above.

An encoder is further provided in the embodiments of the present disclosure. The encoder includes the image processing device 70 and/or the image processing device 80.

A decoder is further provided in the embodiments of the present disclosure. The decoder includes the image processing device 70 and/or the image processing device 80.

The embodiments of the present disclosure can be applied to the field of aircrafts, especially unmanned aerial vehicles.

The division of circuits, sub-circuits, and sub-units in the embodiments of the present disclosure is only schematic. Those of ordinary skills in the art may realize that the circuits, sub-circuits, and sub-units of the examples described in the embodiments can be further divided or combined.

In the above embodiments, it can be implemented in whole or in part by software, hardware, firmware, or any combination thereof. When implemented using software, it can be implemented in whole or in part in the form of a computer program product. The computer program product includes one or more computer instructions. When computer instructions are loaded and executed on a computer, the processes or functions according to the embodiments of the present disclosure are generated in whole or in part. The computer may be a general-purpose computer, a special-purpose computer, a computer network, or other programmable devices. Computer instructions can be stored in a computer-readable storage medium or transmitted from one computer-readable storage medium to another computer-readable storage medium. For example, the computer instructions can be transmitted from a website, computer, server, or data center via a wired (e.g., coaxial cable, optical fiber, digital subscriber line (DSL)) or wireless (such as infrared, wireless, microwave, etc.) manner to another website, computer, server or data center. The computer-readable storage medium may be any available medium that can be accessed by a computer or a data storage device including one or more available medium integrated servers, data centers, and the like. The usable media can be magnetic media (such as floppy disks, hard disks and magnetic tapes), optical media (such as high-density digital video disks (DVD)), or semiconductor media (such as solid-state disks (SSD)).

"An embodiment" or "one embodiment" mentioned throughout the disclosure means that a specific feature, structure, or characteristic related to the embodiment is included in at least one embodiment of the present disclosure. Therefore, "in an embodiment" or "in one embodiment" appearing throughout the disclosure does not necessarily refer to the same embodiment. In addition, these specific features, structures, or characteristics may be combined in one or more embodiments in any suitable manner.

In various embodiments of the present disclosure, the size of the sequence numbers of the above processes does not mean that the execution order is sequential. The execution order of each process should be determined by its function and inherent logic and should not apply any limitation to the implementation process in the embodiments of the present disclosure.

In the embodiment of the present disclosure, "B corresponding to A" means that B is associated with A, and B can be determined according to A. However, determining B based on A does not mean determining B based on A alone, and B may also be determined based on A and/or other information.

The term "and/or" in this disclosure is merely an association relationship describing the associated objects and indicates that there may be three relationships. For example, A and/or B may indicate three cases such as A existing alone, A and B existing simultaneously, and B existing alone. In addition, the character "/" in this disclosure generally indicates that the related objects before and after are in an "or" relationship.

Those of ordinary skills in the art may realize that the units and algorithms described in the embodiments of the disclosure can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of this disclosure.

Those of ordinary skills in the art can clearly understand that for the convenience and conciseness of the description, the specific working process of the system, device and unit described above can refer to the corresponding process in the foregoing method embodiments, which will not be repeated here.

In the embodiments provided in this disclosure, the disclosed system, device, and method may be implemented in other ways. For example, the device embodiments described above are only schematic. For example, the division of the units is only a division of logical functions. In actual implementation, there may be other divisions, for example, multiple units or components may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place or may be distributed on multiple network units. Some or all of the units may be selected according to actual needs to achieve the purpose of the solution of this embodiment.

In addition, each functional unit in each embodiment of the present disclosure may be integrated into one processing unit, or each unit may exist alone physically, or two or more units are integrated into one unit.

The above is only the specific implementations of this disclosure, but the scope of this disclosure is not limited to this. Any person skilled in the art can easily think of changes or replacements within the technical scope disclosed in this disclosure, which should be covered by the scope of this disclosure. Therefore, the scope of the invention shall be subject to the following claims.

The invention claimed is:

1. A video processing method comprising:
   determining, according to an identifier, an image before a current frame in time sequence as a long-term reference image;
   determining a motion vector candidate list of a current coding unit;
   receiving a plurality of indexes;
   obtaining an initial motion vector of the current coding unit from the motion vector candidate list according to the indexes; and
   performing prediction for the current coding unit based on the initial motion vector, including:
      in response to determining a reference image pointed to by the initial motion vector to be a short-term reference image, performing prediction for the current coding unit according to a corrected motion vector obtained by:
         performing a search near an image block pointed to by the initial motion vector in the reference image; and
         obtaining the corrected motion vector based on an image block found by the search; and
      in response to determining the reference image to be a long-term reference image, performing prediction for the current coding unit according to the initial motion vector without correcting the initial motion vector.

2. The method of claim 1, wherein a reference image pointed to by a candidate motion vector in the motion vector candidate list is a short-term reference image.

3. The method of claim 1, wherein determining the motion vector candidate list includes:
   determining a candidate motion vector for adding into the motion vector candidate list; and
   in response to a reference image pointed to by the candidate motion vector is a short-term reference image, adding the candidate motion vector into the motion vector candidate list.

4. The method of claim 3, further comprising:
   determining that the reference image pointed to by the candidate motion vector is a short-term reference image based on a frame identifier of the reference image pointed to by the candidate motion vector.

5. The method of claim 1, wherein the motion vector candidate list includes at least one of:
   an original advanced motion vector prediction (AMVP) candidate motion vector obtained relative to a short-term reference image when the current coding unit is under an AMVP mode;
   a merged candidate motion vector obtained relative to a short-term reference image;
   a motion vector obtained by interpolation from short-term reference images; or
   an upper neighboring motion vector and a left neighboring motion vector of the current coding unit relative to a short-term reference image.

6. The method of claim 1, wherein obtaining the initial motion vector from the motion vector candidate list includes:
   determining distortion costs of candidate motion vectors in the motion vector candidate list based on at least one of a bidirectional matching method or a template matching method; and determining one of the candidate motion vectors having a lowest distortion cost as the initial motion vector.

7. The method of claim 1, wherein obtaining the corrected motion vector includes:
generating a sub motion vector candidate list for the current coding unit, the sub motion vector candidate list including the initial motion vector; and
determining a candidate motion vector in the sub motion vector candidate list having a lowest distortion cost as the corrected motion vector.

8. The method of claim 1, wherein performing the prediction for the current coding unit based on the initial motion vector further includes determining whether the reference image is the short-term reference image or the long-term reference image without considering a reference type of the current coding unit.

9. The method of claim 1, wherein performing prediction for the current coding unit according to the corrected motion vector in response to determining the reference image to be the short-term reference image includes always performing prediction for the current coding unit according to the corrected motion vector in response to determining the reference image to be the short-term reference image.

10. An encoder comprising:
a memory storing computer executable instructions; and
a processor configured to execute the instructions to:
determine, according to an identifier, an image before a current frame in time sequence as a long-term reference image;
determine a motion vector candidate list of a current coding unit;
receive a plurality of indexes;
obtain an initial motion vector of the current coding unit from the motion vector candidate list according to the indexes; and
perform prediction for the current coding unit based on the initial motion vector, including:
in response to determining a reference image pointed to by the initial motion vector to be a short-term reference image, performing prediction for the current coding unit according to a corrected motion vector obtained by:
performing a search near an image block pointed to by the initial motion vector in the reference image; and
obtaining the corrected motion vector based on an image block found by the search; and
in response to determining the reference image to be a] long-term reference image, performing prediction for the current coding unit according to the initial motion vector without correcting the initial motion vector.

11. The encoder of claim 10, wherein a reference image pointed to by a candidate motion vector in the motion vector candidate list is a short-term reference image.

12. The encoder of claim 10, wherein the processor is further configured to execute the instructions to:
determine a candidate motion vector for adding into the motion vector candidate list; and
in response to a reference image pointed to by the candidate motion vector is a short-term reference image, add the candidate motion vector into the motion vector candidate list.

13. The encoder of claim 12, wherein the processor is further configured to execute the instructions to:
determine that the reference image pointed to by the candidate motion vector is a short-term reference image based on a frame identifier of the reference image pointed to by the candidate motion vector.

14. The encoder of claim 10, wherein the motion vector candidate list includes at least one of:
an original advanced motion vector prediction (AMVP) candidate motion vector obtained relative to a short-term reference image when the current coding unit is under an AMVP mode;
a merged candidate motion vector obtained relative to a short-term reference image;
a motion vector obtained by interpolation from short-term reference images; or
an upper neighboring motion vector and a left neighboring motion vector of the current coding unit relative to a short-term reference image.

15. The encoder of claim 10, wherein the processor is further configured to execute the instructions to:
determine distortion costs of candidate motion vectors in the motion vector candidate list based on at least one of a bidirectional matching method or a template matching method; and
determine one of the candidate motion vectors having a lowest distortion cost as the initial motion vector.

16. The encoder of claim 10, wherein the processor is further configured to execute the instructions to:
generate a sub motion vector candidate list for the current coding unit, the sub motion vector candidate list including the initial motion vector; and
determine a candidate motion vector in the sub motion vector candidate list having a lowest distortion cost as the corrected motion vector.

17. A decoder comprising:
a memory storing computer executable instructions; and
a processor configured to execute the instructions to:
determine, according to an identifier, an image before a current frame in time sequence as a long-term reference image;
determine a motion vector candidate list of a current coding unit;
receive a plurality of indexes;
obtain an initial motion vector of the current coding unit from the motion vector candidate list according to the indexes; and
perform prediction for the current coding unit based on the initial motion vector, including:
in response to determining a reference image pointed to by the initial motion vector to be a short-term reference image, performing prediction for the current coding unit according to a corrected motion vector obtained by:
performing a search near an image block pointed to by the initial motion vector in the reference image; and
obtaining the corrected motion vector based on an image block found by the search; and
in response to determining the reference image to be a long-term reference image, performing prediction for the current coding unit according to the initial motion vector without correcting the initial motion vector.

18. The decoder of claim 17, wherein the processor is further configured to execute the instructions to:
determine a candidate motion vector for adding into the motion vector candidate list; and in response to a reference image pointed to by the candidate motion vector is a short-term reference image, add the candidate motion vector into the motion vector candidate list.

19. The decoder of claim 18, wherein the processor is further configured to execute the instructions to:
determine that the reference image pointed to by the candidate motion vector is a short-term reference image based on a frame identifier of the reference image pointed to by the candidate motion vector.

20. The decoder of claim 17, wherein the motion vector candidate list includes at least one of:
an original advanced motion vector prediction (AMVP) candidate motion vector obtained relative to a short-term reference image when the current coding unit is under an AMVP mode;
a merged candidate motion vector obtained relative to a short-term reference image;
a motion vector obtained by interpolation from short-term reference images; or
an upper neighboring motion vector and a left neighboring motion vector of the current coding unit relative to a short-term reference image.

* * * * *